US 6,529,218 B2

(12) United States Patent
Ogawa et al.

(10) Patent No.: US 6,529,218 B2
(45) Date of Patent: *Mar. 4, 2003

(54) DISPLAY CONTROL WITH MOVABLE OR UPDATABLE AUXILIARY INFORMATION

(75) Inventors: Hideaki Ogawa, Kyoto (JP); Hidekazu Tanigawa, Osaka (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,174

(22) Filed: Jul. 9, 1999

(65) Prior Publication Data

US 2002/0180802 A1 Dec. 5, 2002

(30) Foreign Application Priority Data

Jul. 13, 1998 (JP) .......................................... 10-196909

(51) Int. Cl.$^7$ ................................................. G06F 3/14
(52) U.S. Cl. ...................... 345/799; 345/784; 345/804; 345/864; 701/211; 340/995
(58) Field of Search ................................ 345/799, 784, 345/804, 864, 788, 789, 786, 808, 809, 781, 160, 169; 701/211, 208, 212, 213; 340/990, 995

(56) References Cited

U.S. PATENT DOCUMENTS

| | | | | |
|---|---|---|---|---|
| 4,789,962 A | * | 12/1988 | Berry et al. ............ | 345/788 X |
| 5,025,484 A | * | 6/1991 | Tamanari et al. ........ | 345/781 X |
| 5,821,931 A | * | 10/1998 | Berquist et al. ............ | 345/784 |
| 5,917,436 A | * | 6/1999 | Endo et al. .................. | 340/995 |
| 5,917,492 A | * | 6/1999 | Bereiter et al. ......... | 345/799 X |
| 6,199,015 B1 | * | 3/2001 | Curtwright et al. .......... | 701/213 |

FOREIGN PATENT DOCUMENTS

| | | | | |
|---|---|---|---|---|
| JP | 5-73248 | 3/1993 | ............. | G06F/3/14 |
| JP | 5-150926 | 6/1993 | ............. | G06F/3/14 |

* cited by examiner

*Primary Examiner*—Raymond J. Bayerl
(74) *Attorney, Agent, or Firm*—Nixon Peabody LLP; Donald R. Studebaker

(57) ABSTRACT

A display controller includes: an output device with a display and an audio output port; external storage; an external input device; and a key input device. On the external storage, menu for map information, positional coordinates of the menu when displayed on the screen, and positional coordinates of the map information when displayed on the screen are stored. The external input device includes a navigation controller and a GPS receiver. When an image scrolling instruction is input through the key input device, the menu moves in the direction in which the display image is moving.

8 Claims, 10 Drawing Sheets

Fig. 6

```
<MENU>
DISPLAY LOCATION(x, y)
            <ITEM>   ENLARGE        <OPERATION>   ShowLargeMap
            <ITEM>   REDUCE         <OPERATION>   ShowSmallMap
                       ⋮                             ⋮
            <ITEM> DELETE MENU      <OPERATION>   DeleteMenu
</MENU>
```

WHEN SCROLLED LEFTWARD "←"

WHEN SCROLLED RIGHTWARD "→"

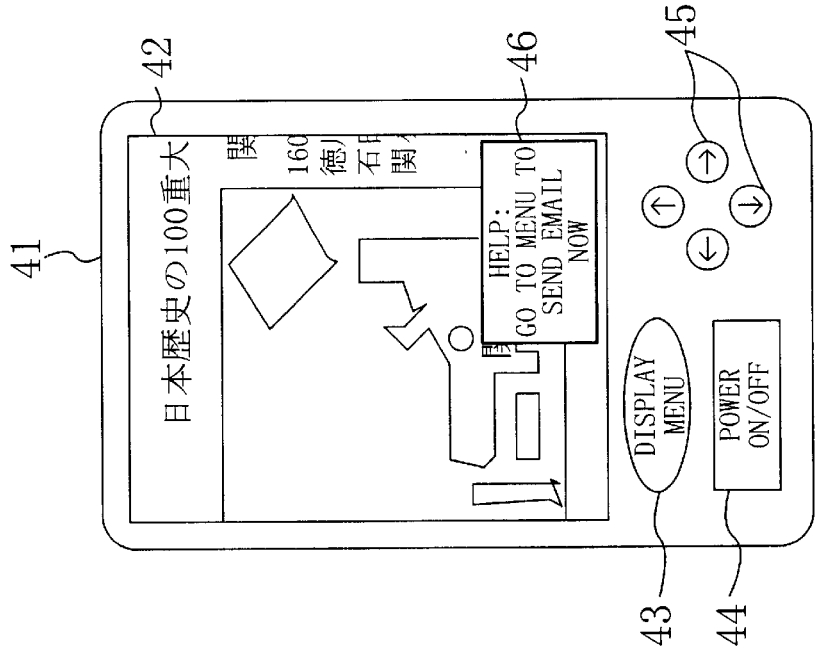
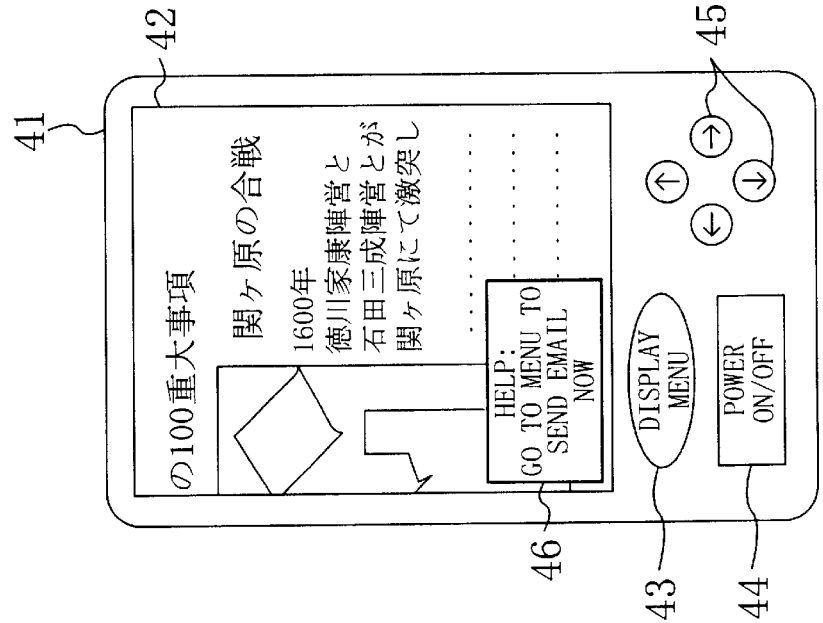

DISPLAY CONTROL WITH MOVABLE OR UPDATABLE AUXILIARY INFORMATION

BACKGROUND OF THE INVENTION

The present invention relates generally to a display controller for use in an information processor or a mobile communications unit with a display screen of a relatively small size, like a navigation system or a portable electronic organizer. More particularly, the present invention relates to apparatus and method for controlling the location of auxiliary information such as menu or help on the display screen relative to display information presented thereon. And this invention also relates to a computer-readable storage medium, on which a display control program has been stored to implement the inventive method.

Hereinafter, a prior art information processor as disclosed in Japanese Laid-Open Publication No. 5-150926 will be outlined. The information processor includes input device, display, editor and display controller. The display controller includes move-instructing section, determining section and allocating section. On the display, not only document information, which has been edited in accordance with a command or instruction input by the user with the input device, but also editing menu are presented. The editor edits the document following an option selected by the user from the editing menu. On determining that the input instruction is "Move Menu", the determining section moves the editing menu to a destination instructed. On the other hand, where the input instruction has turned out to be "Change Menu Size", then the determining section selects an appropriate combination of editing menu options that can be displayed within a menu of the changed size. The allocating section allocates the newly selected editing menu options to the menu display area that has changed its size.

The conventional display controller directly moves the menu or reduces its size following a command given by the user. Accordingly, when the user scrolls the display image on the display, information newly appearing on the screen along with that scrolling is partially hidden behind the menu and cannot be viewed. In such a situation, every time new information is hidden behind the menu, the user has to move the menu or reduce its size, thus interfering with his or her desired scrolling or making that sort of operation unnecessarily troublesome.

SUMMARY OF THE INVENTION

An object of the present invention is automatically moving auxiliary information like menu displayed on a screen to such a location as not to hide an image newly appearing thereon when the image is scrolled without interfering with that scrolling.

To achieve this object, a first exemplary display controller according to the present invention includes: a display screen for presenting thereon at least part of display information as a display image. Part of the display screen is allocated for an auxiliary information display area. The first display controller further includes means for moving the auxiliary information display area on the display screen in a direction in which the display image is scrolled.

In the first display controller, when the display image is scrolled, the moving means moves the auxiliary information display area on the display screen in a direction in which the display image moves. Thus, even when a new image appears on the display screen as a result of scrolling, that new display image is not hidden behind the auxiliary information display area. Accordingly, the user can know his or her desired information more quickly and with more certainty without performing troublesome operations.

A second exemplary display controller according to the present invention includes: a display screen for presenting thereon at least part of display information as a display image; an external input device for receiving and outputting a scroll instruction signal, which is externally supplied to scroll the display image; information storage for storing thereon auxiliary information to be presented on the display screen and information about a location at which the auxiliary information is to be displayed; and means, responsive to the scroll instruction signal supplied from the external input device, for updating the display location information such that the location of the auxiliary information displayed moves on the display screen in a direction in which the display image moves. The display screen presents the auxiliary information as part of the display image based on the updated display location information.

In the second display controller, when the display image, or at least part of display information presented on the display screen, is scrolled responsive to the scroll instruction signal supplied from the external input device, the updating means updates the display location information such that the location of the auxiliary information displayed moves on the display screen in a direction in which the display image moves. And the display screen presents the auxiliary information as part of the display image based on the updated display location information. Accordingly, the auxiliary information displayed moves on the display screen in the same direction as the display image moving, or being scrolled. Thus, even when a new image appears on the display screen along with scrolling, that new display image is not hidden behind the auxiliary information displayed. As a result, the user can know his or her desired information more quickly and with more certainty without performing troublesome operations.

In the second display controller, the display information may be map information, and the scroll instruction signal is preferably generated by a key input device, a navigation controller or a GPS receiver.

In such an embodiment, the second display controller may be used as a navigation system.

A display controlling method according to the present invention includes the steps of: a) presenting at least part of display information as a display image on a display screen; b) defining an auxiliary information display area on part of the display screen; c) scrolling the display image in response to a scroll instruction signal externally supplied; and d) moving the auxiliary information display area on the display screen in a direction in which the display image is scrolled in response to the scroll instruction signal.

According to the display controlling method of the present invention, the auxiliary information display area is moved on the display screen in a direction in which the display image is scrolled in response to the scroll instruction signal. Thus, even when a new image appears on the display screen along with scrolling, that new display image is not hidden behind the auxiliary information display area.

In the display controlling method of the present invention, the display information may be map information, and the step c) preferably includes the step of generating the scroll instruction signal using a key input device, a navigation controller or a GPS receiver.

A computer-readable storage medium according to the present invention has stored thereon a display control program for presenting at least part of display information on a display screen. The display control program is executable in-a computer for performing the steps of: a) presenting at least part of display information as a display image on a display screen; b) defining an auxiliary information display area on part of the display screen; c) scrolling the display image in response to a scroll instruction signal externally supplied; and d) moving the auxiliary information display area on the display screen in a direction in which the display image is scrolled in response to the scroll instruction signal.

Using this storage medium, the display controlling method of the present invention is easily implementable.

BRIEF DESCRIPTION OF THE DRAWINGS

FIG. 6 is a data structure table showing exemplary menu information of a display control program for the display controller according to the first embodiment.

FIG. 10(a) illustrates an image of help information displayed in default by the display controller according to the second embodiment; and FIG. 10(b) illustrates an image of help information displayed, as a result of rightward scrolling, by the display controller according to the second embodiment.

DESCRIPTION OF THE PREFERRED EMBODIMENTS

EMBODIMENT 1

Hereinafter, a first exemplary embodiment of the present invention will be described with reference to the accompanying drawings.

Figure 1:
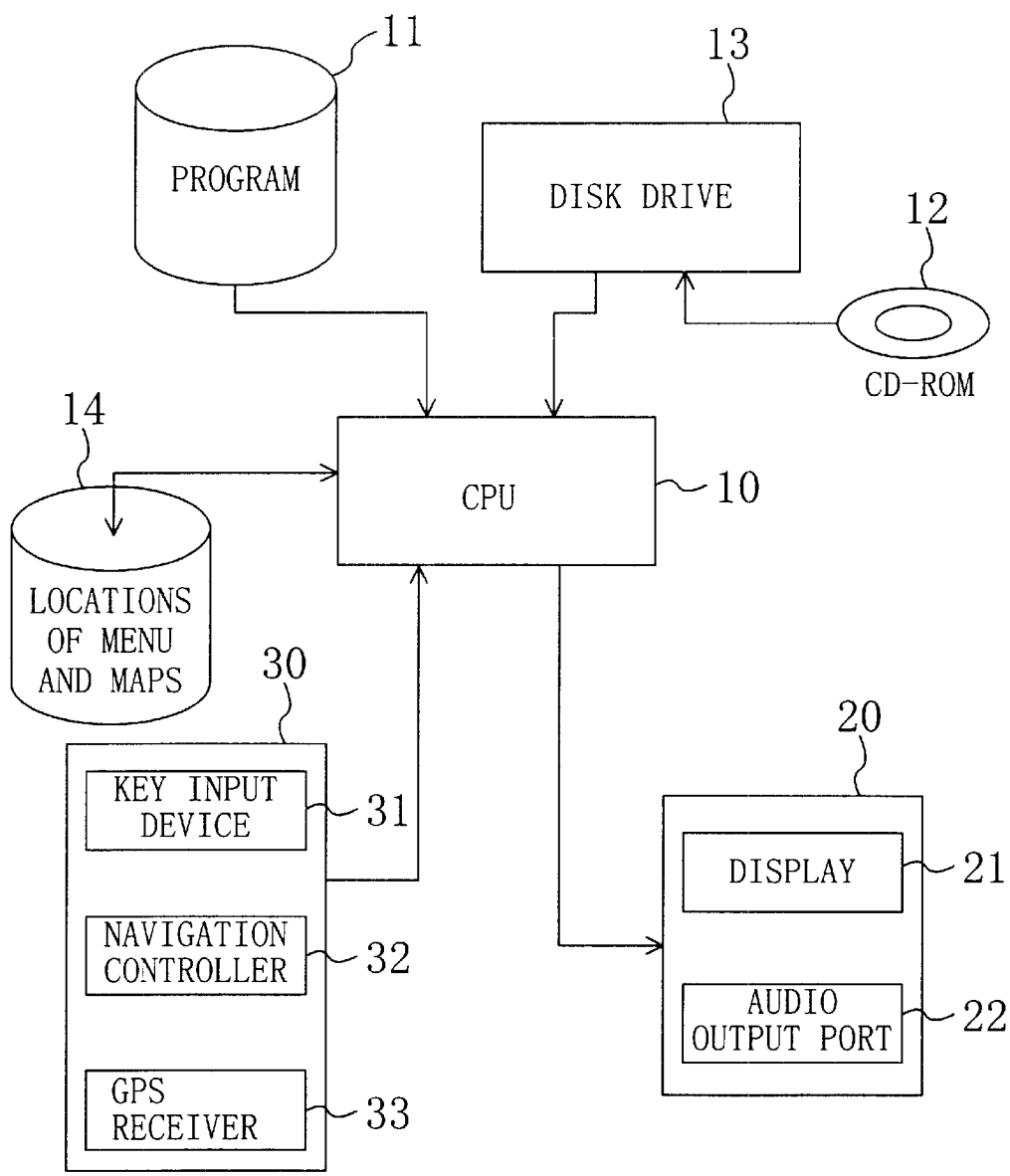
FIG. 1 is a functional block diagram illustrating a display controller according to a first embodiment of the present invention.

FIG. 1 illustrates an arrangement of functional blocks for an exemplary display controller according to the first embodiment implemented as a map display device like a car navigation system. As shown in FIG. 1, a central processing unit (CPU) 10, or a microprocessor unit (MPU), which is built in a computer, controls the overall operation of the system by reading and executing a display control program 11 either sequentially or responsive to instructions of various events externally input. The CPU 10 also reads out display information when so required by the user, e.g., reading map information stored on a CD-ROM 12 via a disk drive 13, and then outputs the information to an output device 20. In this case, the display control program 11 may be implemented as a ROM. Alternatively, at least part of the data stored on a computer-readable storage medium such as a CD-ROM may also be installed in advance as the display control program 11 on an internal memory, or primary storage, of the computer.

The output device 20 includes: a display 21 such as a liquid crystal display or a CRT; and an audio output port 22 for outputting a sound to attract the user's attention, e.g., a buzzer or a loudspeaker.

External storage 14, e.g., a nonvolatile memory like an EEPROM or an external memory like a memory card, is connected as auxiliary, or secondary, storage to the CPU 10. On the external storage 14, menu information used as auxiliary information for controlling the display of map information, for example, positional coordinates of the menu information when displayed on the screen, maps of various scales and the positional coordinates of the maps when displayed on the screen are stored.

An external input device 30 may include a key input device 31, a navigation controller 32 and a GPS receiver 33, for example.

The key input device 31 is implementable as push buttons, a touch panel or an input pen, for instance, and various instructions like "Power ON/OFF","Display menu", "Scroll", "Enlarge or Reduce Map", "Delete Menu" and "Initialize ", are input through the input device 31.

The navigation controller 32 receives a signal from a counter for counting the revolutions per minute of the tires fit on the wheels of a car, for example, thereby performing computations to know how far the car has traveled.

The GPS receiver 33 receives a predetermined signal from a GPS satellite, thereby obtaining data about the current location of the car, for example. In this embodiment, the external storage 14 may also be used for temporarily storing various data supplied from the navigation controller 32 and/or the GPS receiver 33.

In this embodiment, the CD-ROM 12 is used as a storage medium for storing the map information thereon. Alternatively, any other disk storage medium, such as an optical disk like DVD-ROM or mini disk (MD) and a magneto-optical disk, may also be used so long as the medium can be accessed by the disk drive 13. Optionally, magnetic tape (MT), memory (ROM or PROM), memory card or IC card is also usable so long as the disk drive 13 can read the data stored in any of these types of storage media.

Hereinafter, a display controlling method using the display controller with such a configuration will be described with reference to the accompanying drawings.

Figure 2:
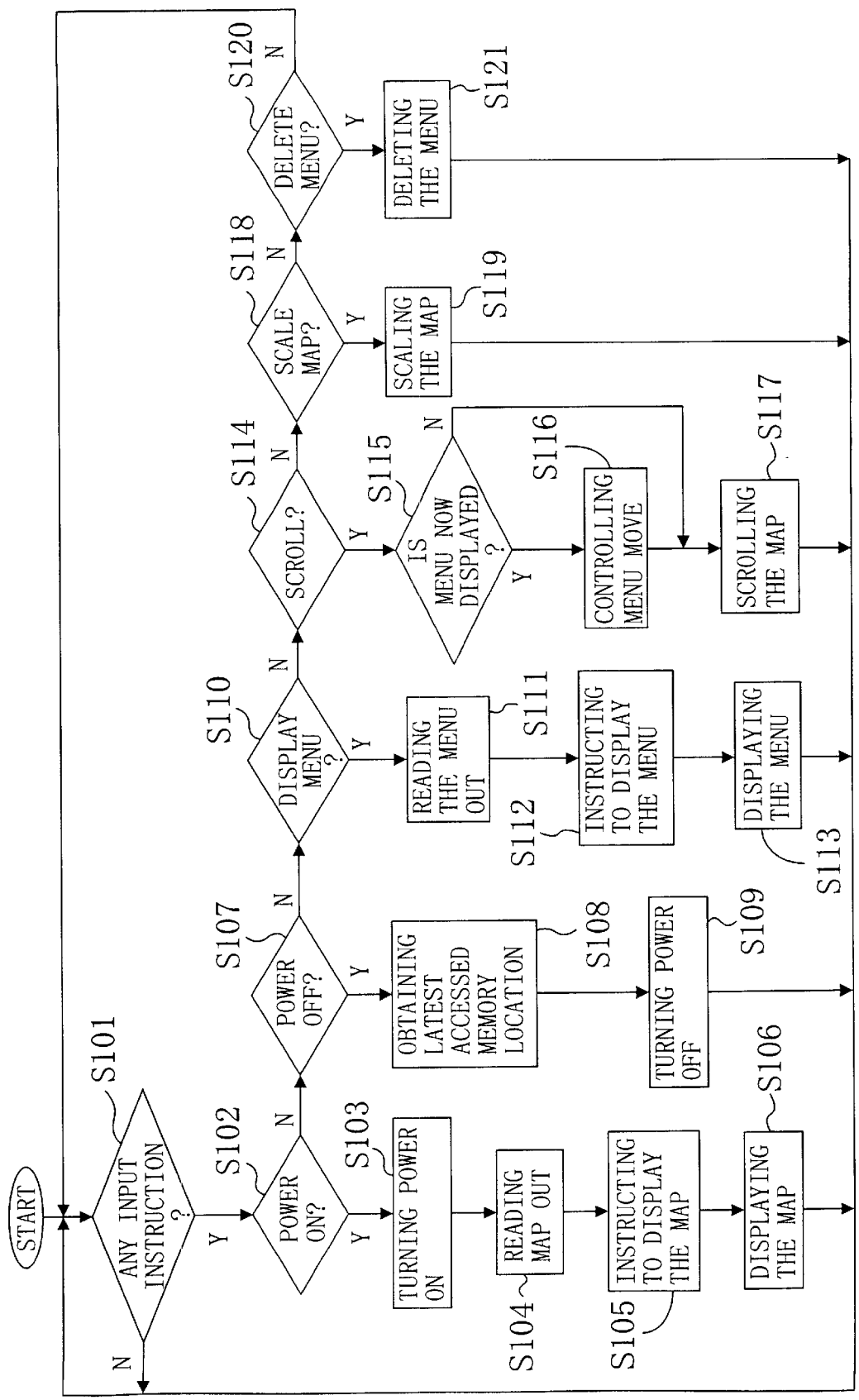
FIG. 2 is a flowchart outlining a display controlling method according to the first embodiment.

FIG. 2. is a flowchart outlining a display controlling procedure using the display controller according to the first embodiment.

STEP S101

First, the CPU 10 determines whether or not any instruction has been input through the key input device 31 in accordance with the display control program 11. If the answer is YES, the procedure advances to Step S102. Otherwise, the procedure returns to Step S101.

STEP S102

Next, the CPU 10 determines whether or not the instruction, which has been input through the key input device 31, is "Power ON". If the answer is YES, the procedure advances to Step S103. Otherwise, the procedure advances to Step S107.

STEP S103

Then, the CPU 10 turns the power ON. In this processing step, it may be determined whether the power is ON or OFF and if the power has already been ON, then the procedure may return to Step S101 without turning the power ON.

STEP S104

Subsequently, the CPU 10 reads out the positional coordinates of map information, which had been displayed on the screen just before "Power OFF" was instructed (i.e., a latest accessed memory location), from the external storage 14. In response, the disk drive 13 reads out the map information, corresponding to the positional coordinates, from the CD-ROM 12 and stores it in the primary storage.

STEP S105

Thereafter, CPU 10 instructs the output device 20 to display the map information read out from the CD-ROM 12.

STEP S106

After the output device 20 has presented the map information on the screen, the procedure returns to Step S101.

STEP S107

The CPU 10 determines whether or not the instruction, which has been input through the key input device 31, is "Power OFF". If the answer is YES, the procedure advances to Step S108. Otherwise, the procedure advances to Step S110.

STEP S108

Next, the CPU 10 stores the positional coordinates of the image currently displayed as map information on the external storage 14, thereby obtaining the latest accessed memory location.

STEP S109

Then, the CPU 10 turns the power OFF to return to Step S101.

STEP S110

The CPU 10 determines whether or not the instruction, which has been input through the key input device 31, is "Display Menu". If the answer is YES, the procedure advances to Step S111. Otherwise, the procedure advances to Step S114.

STEP S111

Next, the CPU 10 reads out the menu information and the information about a location, where the menu information should be displayed on the screen, from the external storage 14 and stores them on the primary storage. In this step, it may be determined whether or not the menu has already been displayed and if the menu is now being displayed, then the procedure may return to Step S101.

STEP S112

Then, the CPU 10 instructs the output device 20 to display the menu information read out from the external storage 14. In this embodiment, the menu information is supposed to be displayed at the lower left corner of the screen in default.

STEP S113

Subsequently, the output device 20 makes up a menu based on the menu information and displays the menu at the designated location on the screen of the display 21. And then the procedure returns to Step S101.

STEP S114

The CPU 10 determines whether or not the instruction, which has been input through the key input device 31, is "Scroll Map". If the answer is YES, the procedure advances to Step S115. Otherwise, the procedure advances to Step S118.

STEP S115

Next, the CPU 10 determines whether or not a menu is now being displayed. If the answer is YES, the procedure advances to Step S116 (i.e., the processing step of moving auxiliary information display area as defined in the appended claims). Otherwise, the procedure jumps to Step S117 because it is not necessary to perform the move control.

STEP S116

Then, the CPU 10 performs the menu-move control, which will be explained in greater detail later.

STEP S117

Following the scroll instruction, the CPU 10 scrolls the image displayed on the screen in the designated direction. Specifically, if the rightward (→), leftward (←), upward (↑) or downward scroll (↓) has been instructed, then the CPU 10 moves the display image right, left, up or down, respectively. After that scrolling is completed, the procedure returns to Step S101.

STEP S118

The CPU 10 determines whether or not the instruction, which has been input through the key input device 31, is "Scale (i.e., Enlarge or Reduce) Map". If the answer is YES, the procedure advances to Step S119. Otherwise, the procedure advances to Step S120.

STEP S119

Then, the CPU 10 scales (i.e., enlarges or reduces) the map at a designated magnification. Specifically, the CPU 10 reads out a scaled map, corresponding to the map currently displayed, from the CD-ROM 12 or the primary storage, and the output device 20 displays the scaled map on the screen.

STEP S120

The CPU 10 determines whether or not the instruction, which has been input through the key input device 31, is "Delete Menu". If the answer is YES, the procedure advances to Step S121. Otherwise, the procedure returns to Step S101.

STEP S121

After the menu has been deleted from the screen, the procedure returns to Step S101. In this step, it may be determined whether or not the menu is now being displayed and if not, the procedure may return to Step S101. The menu deletion processing is not the essential feature of the present invention, and the detailed description thereof will be omitted herein.

Hereinafter, the menu-move control (i.e., Step S116), which is the principal feature of the present invention, will be described in greater detail with reference to the accompanying drawings.

Figure 3:
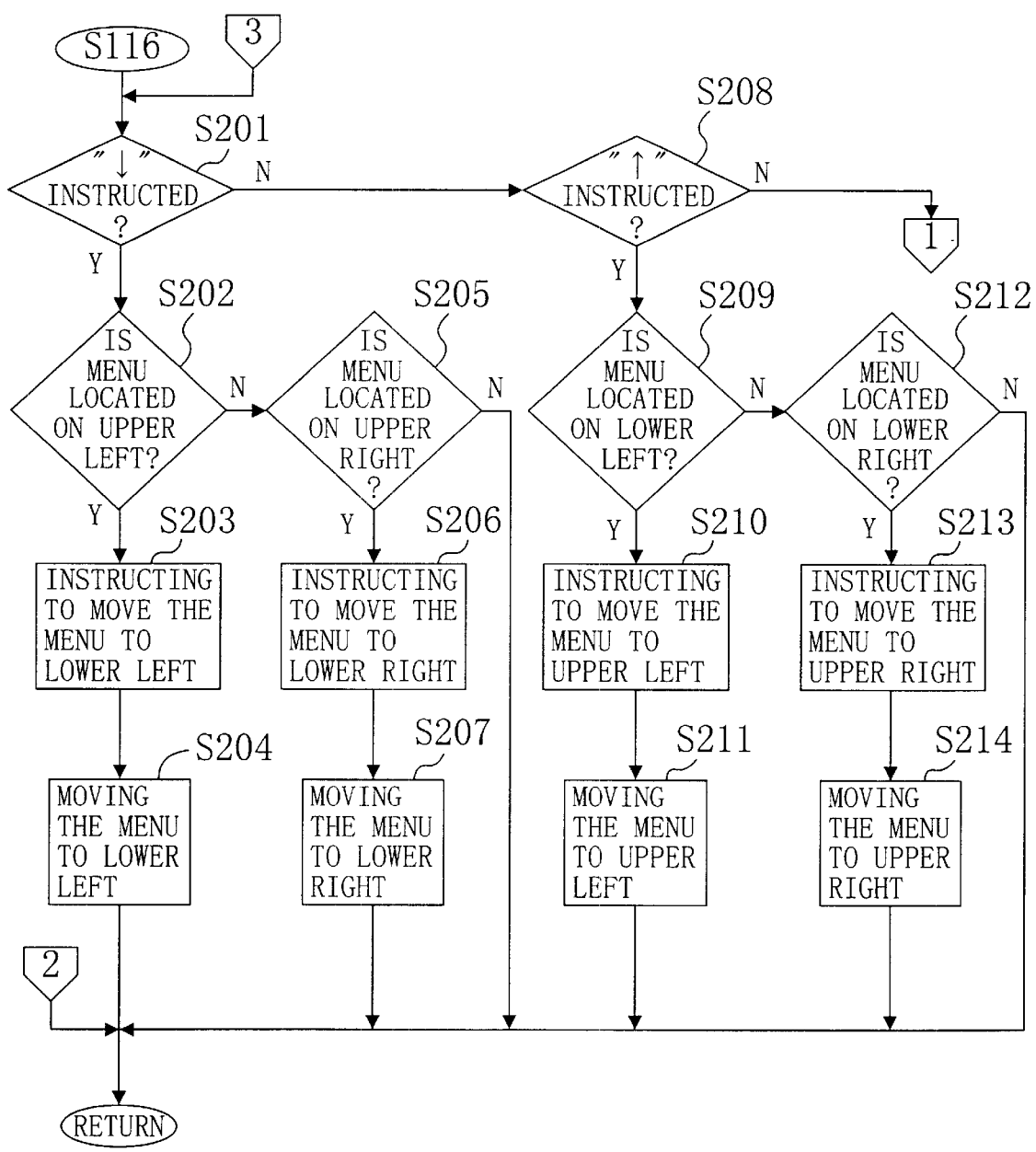
FIG. 3 is a flowchart illustrating in greater detail the processing step of controlling menu move in the display controlling method according to the first embodiment.
Figure 4:
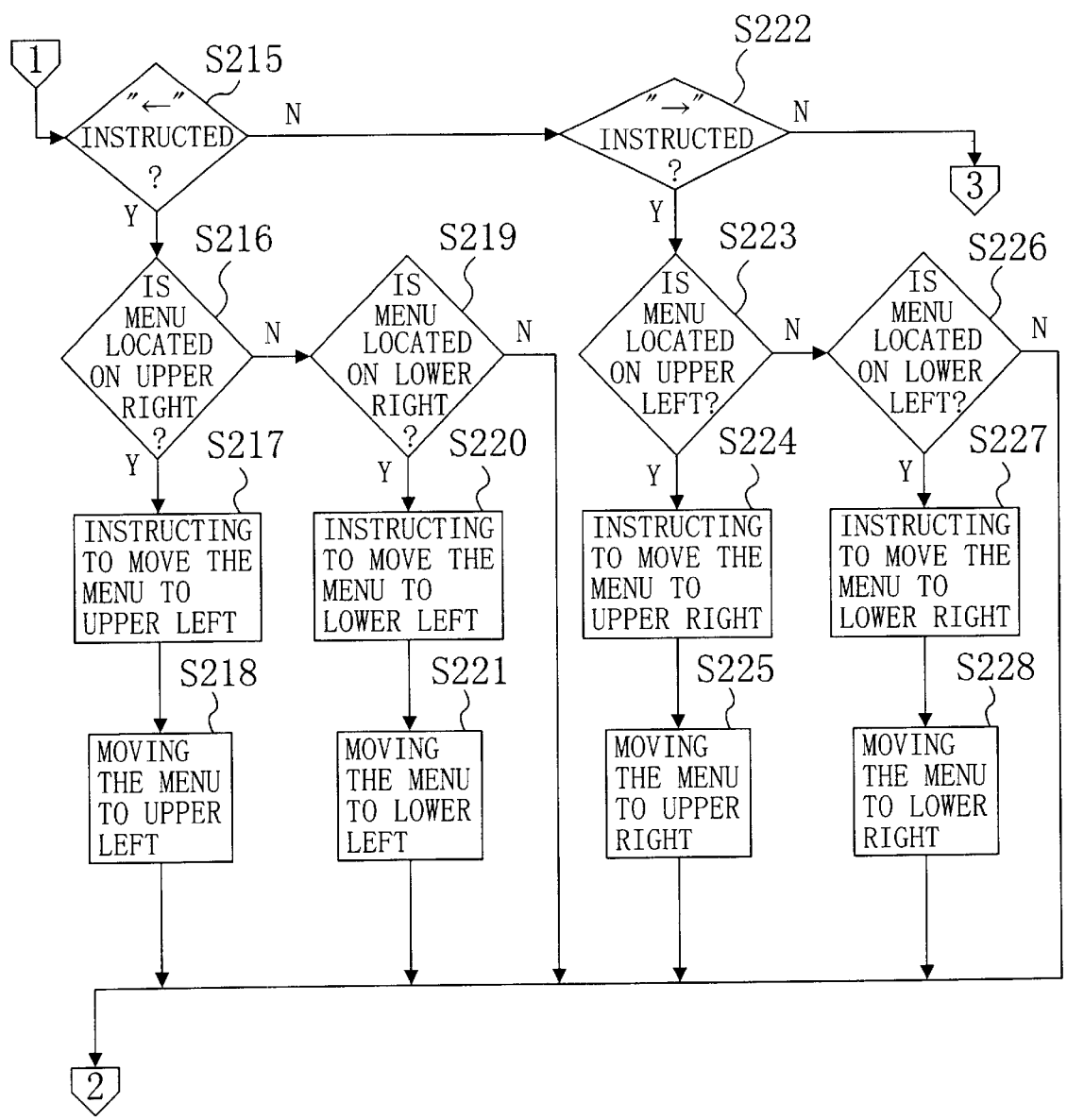
FIG. 4 is a flowchart illustrating in greater detail the processing step of controlling menu move in the display controlling method according to the first embodiment.

FIGS. 3 and 4 illustrate an exemplary flow of menu-move control in the display controlling method according to the first embodiment. Specifically, FIG. 3 illustrates a vertical (i.e., up- or downward) scrolling control, while FIG. 4 illustrates a horizontal (i.e., right- or leftward) scrolling control.

STEP S201

First, in accordance with the display control program 11 shown in FIG. 1, the CPU 10 determines whether or not the instruction, which has been input through the key input device 31, is "Scroll Down (↓)". If the answer is YES, the procedure advances to Step S202. Otherwise, the procedure advances to Step S208.

STEP S202

Next, the CPU 10 determines whether or not the menu is being displayed at the upper left corner on the screen. If the answer is YES, the procedure advances to Step S203. Otherwise, the procedure advances to Step S205.

STEP S203

Then, the CPU 10 instructs the output device 20 to move the menu to the lower left corner on the screen. More specifically, the information stored on the external storage 14 about the location where the menu is displayed (hereinafter, simply referred to as "menu location information") is updated such that the menu is displayed at the lower left corner on the screen.

STEP S204

Based on the updated menu location information, the output device 20 displays the menu at the predetermined location on the screen. That is to say, the output device 20 deletes the menu displayed at the upper left corner on the screen, and instead displays the menu at the lower left corner on the screen.

STEP S205

The CPU 10 determines whether or not the menu is being displayed at the upper right corner on the screen. If the answer is YES, the procedure advances to Step S206. Otherwise, the procedure returns to the main processing shown in FIG. 2 without moving the menu.

STEP S206

Then, the CPU 10 instructs the output device 20 to move the menu to the lower right corner on the screen. More specifically, the menu location information stored on the external storage 14 is updated such that the menu is displayed at the lower right corner on the screen.

STEP S207

Based on the updated menu location information, the output device 20 displays the menu on the screen. As a result, the menu moves to the lower right corner on the screen.

As can be seen, when the display image is scrolled downward (↓), a menu located at the upper left corner is moved to the lower left corner, and a menu located at the upper right corner is moved to the lower right corner. As the display image is scrolled downward (↓), new map information successively appears on the upper half of the display screen. However, since the menu also moves downward, i.e., in the direction in which the display image is moving, the new map information is not hidden behind the menu.

If it has been determined in Step S208 that the input instruction is "Scroll Up (↑)", respective processing steps S209 through S214 are performed thereafter. If a menu being displayed is located at the lower left corner, then the menu is moved to the upper left corner as a result of these processing steps. Alternatively, if a menu is located at the lower right corner, then the menu is moved to the upper right corner. As the display image is scrolled upward (↑), new map information successively appears on the lower half of the screen. However, since the menu also moves upward, i.e., in the direction in which the display image is moving, the new map information is not hidden behind the menu.

If it has been determined in Step S215 shown in FIG. 4 that the input instruction is "Scroll Left (←)", respective processing steps S216 through S221 are performed thereafter. If a menu being displayed is located at the upper right corner, then the menu is moved to the upper left corner as a result of these processing steps. Alternatively, if a menu is located at the lower right corner, then the menu is moved to the lower left corner. As the display image is scrolled leftward (←), new map information successively appears on the right half of the screen. However, since the menu also moves leftward, i.e., in the direction in which the display image is moving, the new map information is not hidden behind the menu.

And if it has been determined in Step S222 shown in FIG. 4 that the input instruction is "Scroll Right (→)", repetive processing steps S223 through S228 are performed thereafter. If a menu being displayed is located at the upper left corner, then the menu is moved to the upper right corner as a result of these processing steps. Alternatively, if the menu is located at the lower left corner, then the menu is moved to the lower right corner. As the display image is scrolled rightward (→) new map information successively appears on the left half of the screen. However, since the menu also moves rightward, i.e., in the direction in which the display image is moving, the new map information is not hidden behind the menu.

In the foregoing description, the scrolling-related move control over the auxiliary information displayed as a menu is supposed to be performed responsive to a scroll instruction signal supplied from the key input device 31. Alternatively, the scroll instruction signal may be naturally supplied from the navigation controller 32 or the GPS receiver 33 included in the external input device 30. Even in those situations, when the display image is scrolled responsive to the scroll instruction signal supplied, the menu also moves in the same direction as the display image being scrolled.

Hereinafter, it will be described with reference to the accompanying drawings how the menu moves on the display screen.

Figure 5:
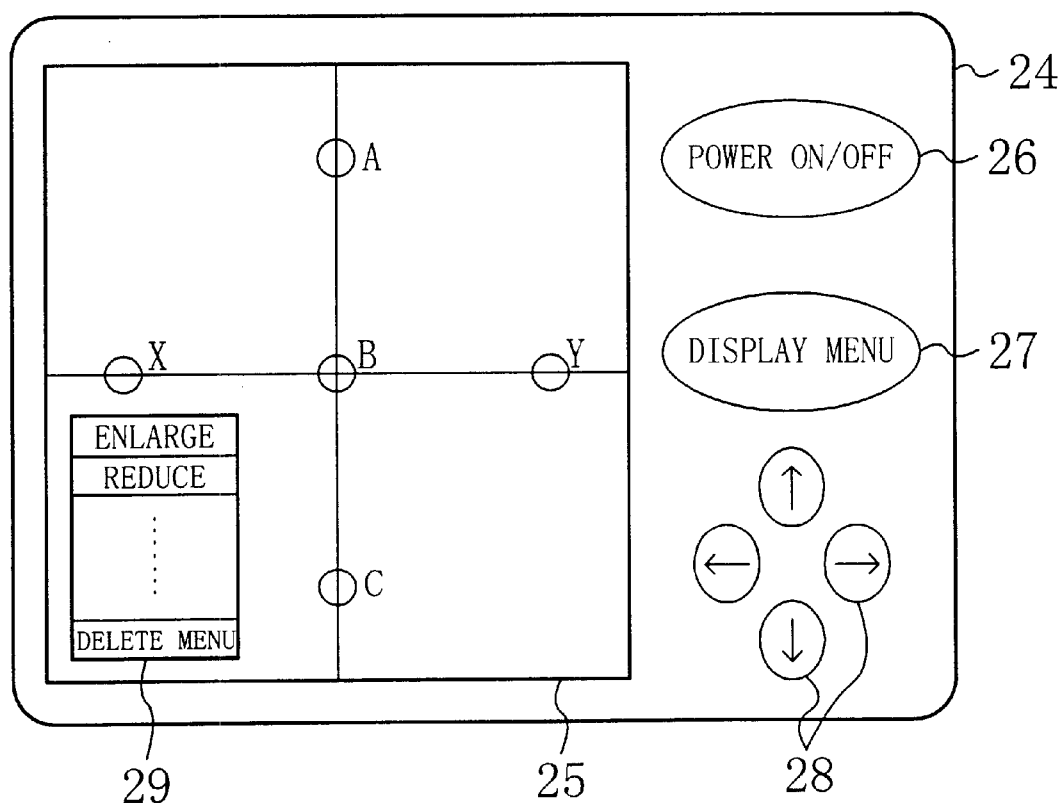
FIG. 5 is a front view illustrating a display screen of the display controller according to the first embodiment.

FIG. 5 is a front view illustrating the display 24 of an exemplary display controller according to the first embodiment implemented as a car navigation system, in which a display screen and a key input device are integrally formed in combination. As shown in FIG. 5, the display 24 includes: a display panel 25 serving as the display screen; and "Power ON/OFF" switch 26, "Display Menu" switch 27 and "Scroll Up", "Scroll Down", "Scroll Right" and "Scroll Left" switches 28, which make up the key input device together. In the illustrated embodiment, the names of Cities A, B, C, X and Y and various routes connecting these cities are supposed to be displayed on the display panel 25. Also, when the "Display Menu" switch 27 is pushed ON, a menu 29, which is exemplary auxiliary information, is displayed at the lower left corner on the screen, which is a default display location as described above.

FIG. 6 illustrates an exemplary data structure of the menu 29. This data structure includes: information about the location of the menu 29 on the display panel 25 (i.e., menu location information); and instruction items such as "Show Large Map", "Show Small Map" and "Delete Menu".

Figure 7A:
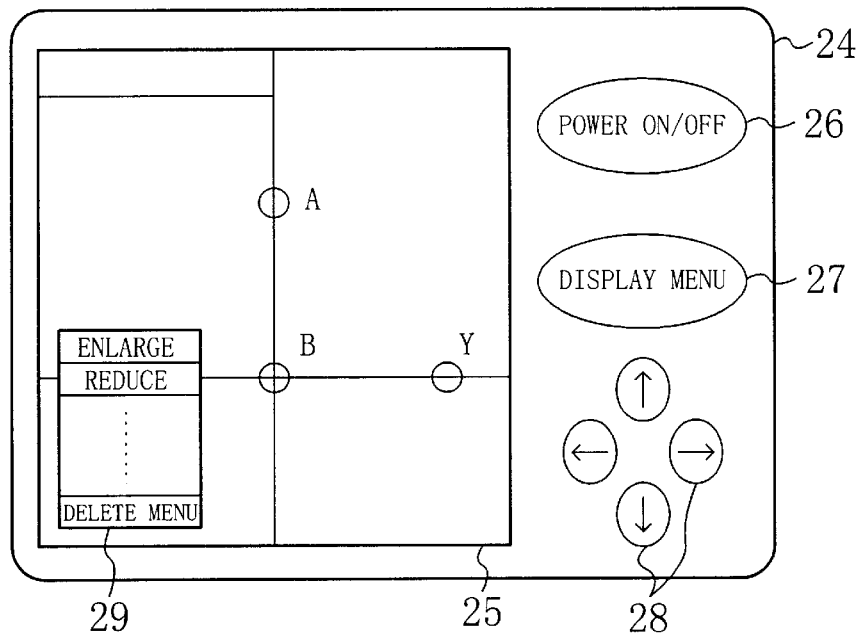
FIG. 7(a) illustrates an image displayed, as a result of downward scrolling, on the display screen of the display controller according to the first embodiment.
Figure 7B:
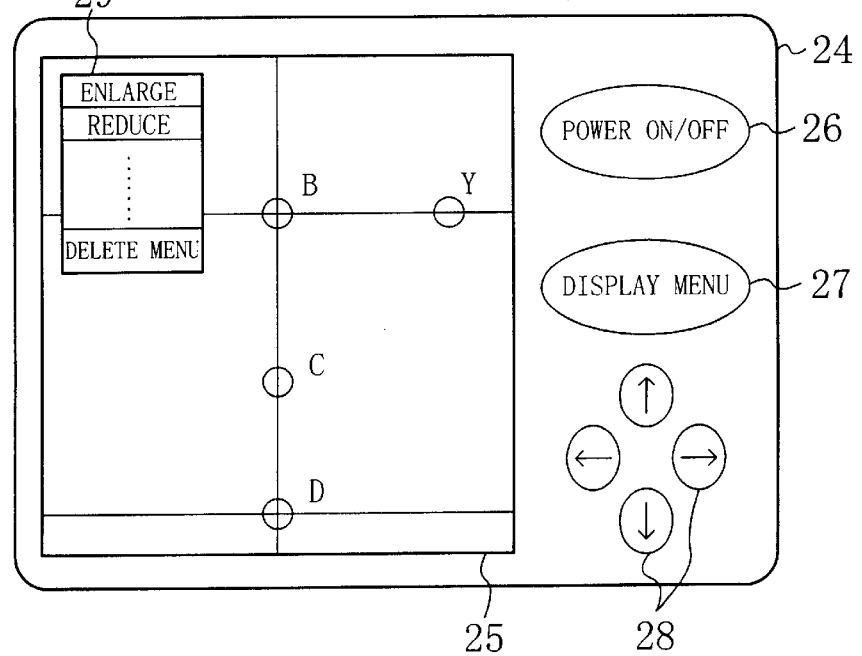
FIG. 7(b) illustrates an image displayed, as a result of upward scrolling, on the display screen of the display controller according to the first embodiment.

Hereinafter, it will be described with reference to FIGS. 7(*a*) through 8(*b*) how the location of the menu 29 changes sequentially with the scrolling of the display image shown in FIG. 5. In FIGS. 7(*a*), 7(*b*), 8(*a*) and 8(*b*), the same components as those illustrated in FIG. 5 are identified by the same reference numerals, and the description thereof will be omitted herein.

FIG. 7(*a*) illustrates an image displayed on the display panel 25 as a result of downward scrolling (↓). As shown in FIG. 7(*a*), when the display image is scrolled downward (↓), the menu 29 does not move, because the menu 29 has already been located at the lower left corner before the scrolling is started and the answers to the queries in Steps S202 and S205 shown in FIG. 3 are both "NO". Accordingly, a route, which has appeared on the upper half of the screen for the first time as a result of downward scrolling, is not hidden behind the menu 29.

Alternatively, if the display image has been scrolled upward (↑) as shown in FIG. 7(*b*), then the answer to the query in Step S209 shown in FIG. 3 is "YES". Thus, the processing steps S210 and S211 are performed to move the menu 29 to the upper left corner. Accordingly, a newly displayed city D and a route passing the city D, which have appeared on the lower half of the screen for the first time as a result of upward scrolling, are not hidden behind the menu 29.

Figure 8A:
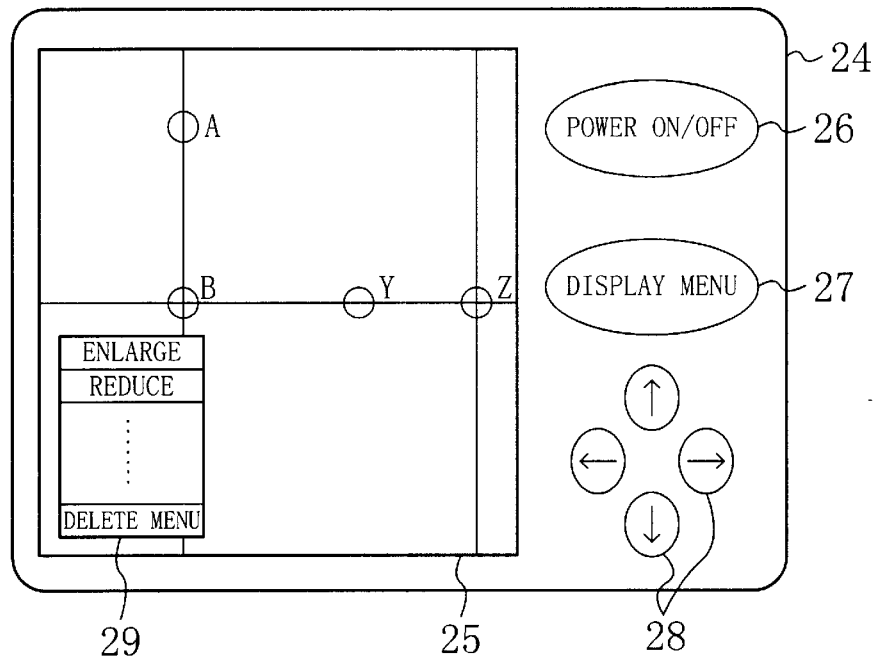
FIG. 8(a) illustrates an image displayed, as a result of leftward scrolling, on the display screen of the display controller according to the first embodiment.

As another alternative, if the display image has been scrolled leftward (←) as shown in FIG. 8(a), the menu 29 does not move either, because the menu 29 has already been located at the lower left corner before the scrolling is started and the answers to the queries in Steps S216 and S219 shown in FIG. 4 are both "NO". Accordingly, a newly displayed city Z and a route passing the city Z, which have appeared on the right half of the screen for the first time as a result of leftward scrolling, are not hidden behind the menu 29.

Figure 8B:
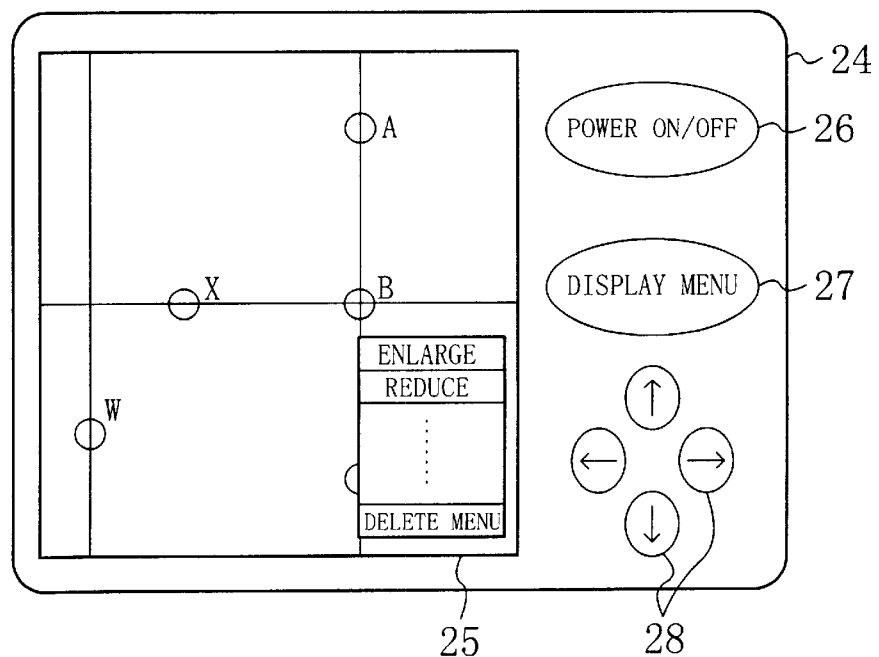
FIG. 8(b) illustrates an image displayed, as a result of rightward scrolling, on the display screen of the display controller according to the first embodiment.

The other possibility is that the display image has been scrolled rightward (→) as shown in FIG. 8(b). In such a situation, the answer to the queries in Steps S223 and S226 shown in FIG. 4 are "NO" and "YES", respectively. Thus, the processing steps S227 and S228 are performed to move the menu 29 to the lower right corner on the screen. Accordingly, a newly displayed city W and a route passing the city W, which have appeared on the left half of the screen for the first time as a result of rightward scrolling, are not hidden behind the menu 29.

As described above, in the display controller and display controlling method of the first embodiment, when an external scrolling trigger is received, the menu moves in the direction in which the display image is moving so as not to interfere with the presentation of map information newly appearing on the screen. Thus, the user can know his or her desired information more quickly and with more certainty without performing troublesome operations.

As can be seen, by moving the menu 29, or the auxiliary information, in the same direction as the image being scrolled with the image scrolling instruction used as a trigger, the contents of desired information on the screen can be understood much more easily.

In the foregoing embodiment, the destinations of the menu 29 are supposed to be the four corners of the screen. Alternatively, the destinations may be defined at any other locations far away from the area where new information appears. The menu 29 is supposed to be moved either horizontally or vertically along the outer frame of the display panel, e.g., from the upper to lower right corner or from the lower right to lower left corner. Instead, the menu 29 may also be moved both horizontally and vertically, e.g., from the lower right to upper left corner. It should be noted, however, that the menu 29 still has to be moved in the scrolling direction even in such a case.

Furthermore, the present invention has been described as being applied to a map display device for use in a navigation system. However, the present invention is in no way limited to such a specific embodiment, but is applicable to any other display device for presenting information of any other nature thereon. For example, this invention is effectively applicable to confirming the contents of a letter to be faxed or an email to be sent using some portable terminal unit such as an information processor or communications unit with a relatively small screen like a portable electronic organizer or a cellular phone.

Also, a display control program so written as to make a computer execute various steps of the display controlling method of the present invention may be stored on a computer-readable storage medium such as flexible disk (FD), CD-ROM, DVD-ROM or semiconductor memory device like ROM, PROM or memory card. In such a case, the applications of the present invention can be found in an even wider range.

EMBODIMENT 2

Hereinafter, a second exemplary embodiment of the present invention will be described with reference to the accompanying drawings.

Figure 9:
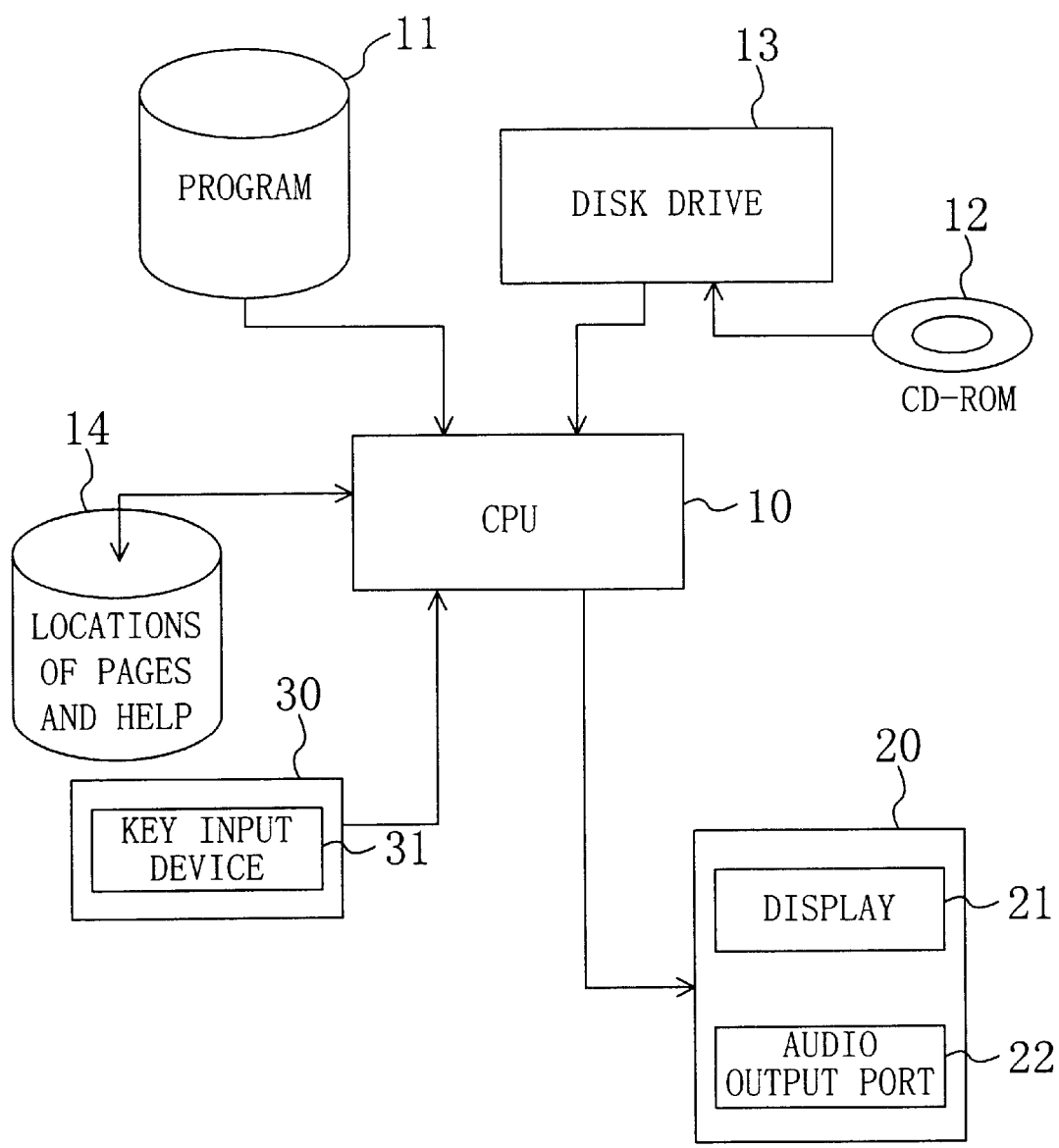
FIG. 9 is a functional block diagram illustrating a display controller according to a second embodiment of the present invention.

FIG. 9 illustrates an arrangement of respective functional blocks for an exemplary display controller according to the second embodiment implemented as an electronic book device. In FIG. 9, the same components as those illustrated in FIG. 1 are identified by the same reference numerals and the description thereof will be omitted herein. The electronic book device of the second embodiment reads out the contents of a book, which is stored on a storage medium such as the CD-ROM 12, via the disk drive 13 and then presents the information on the display 21 of the output device 20.

Through the key input device 31 implemented as an exemplary external input device 30, various instructions like "Power ON/OFF", "Display Page", "Page Up/Down", "Scroll Page" and "Display Help", are input.

The contents of a page to be displayed and the number of the page are stored in combination on the external storage 14. Help information, which is auxiliary information helping the user operate the electronic book device, and detailed information, which illustrates in detail the contents of the page paired with the page number, are also stored on the external storage 14.

Hereinafter, it will be described with reference to the accompanying drawings how the help information move on the display screen in the electronic book device with such figuration.

FIGS. 10(a) and 10(b) are front views of the electronic book device according to this embodiment, in which the display screen and the key input device are also integrally formed in combination. As shown in FIG. 10(a), the electronic book device 41 includes: a display panel 42 serving as the display screen; and "Display Menu" switch 43, "Power ON/OFF" switch 44, and "Scroll Up", "Scroll Down", "Scroll Right" and "Scroll Left" switches 45, which make up the key input device together. In the illustrated embodiment, an item of the book (or dictionary) is supposed to be now displayed on the display panel 42, for example. Also, when the "Display Menu" switch 43 is pushed ON, help information 46, which is exemplary auxiliary information display area, is displayed at the lower left corner on the screen, which is a default display location.

In controlling the display of the electronic book device according to the second embodiment, the same method as that for controlling the display of the navigation system according to the first embodiment as shown in FIGS. 3 and 4 is employed. Accordingly, if an instruction "Scroll Right (←)"has been input, then the help information 46, which has been located at the lower left corner on the screen, moves to the lower right corner on the screen as shown in FIG. 10(b).

As described above, according to the second embodiment, when an external scrolling trigger is received the help information 46 moves in the direction in which the display image is moving so as not to interfere with the presentation of information newly appearing on the screen. Thus, the user can know his or her desired information more quickly and with more certainty without performing troublesome operations.

By moving the help information 46, or the auxiliary information, in the same direction as the image being scrolled with the image scrolling instruction used as a trigger, the contents of desired information on the screen can be understood much more easily.

Also, a display control program so written as to make a computer execute various steps of the display controlling method of the second embodiment may be stored on a computer-readable storage medium such as flexible disk (FD), CD-ROM, DVD-ROM or semiconductor memory device like ROM, PROM or memory card. In such a case, the applications of the present invention can be found in an even wider range.

What is claimed is:

1. A display controller comprising:
   a display screen for presenting thereon a part of display information as a display image, part of the display screen being allocated for an auxiliary information display area; and
   means for, deciding if the auxiliary information display area on the display screen is to be moved or not, based on a present location of the auxiliary information display area and a scrolling direction, and if the auxiliary information display area is to be moved, moving the auxiliary information display area in a direction in which the display image is scrolled.

2. The display controller of claim 1, wherein the auxiliary information display araea moves within a range such that it does not disappear from the display screen.

3. The display controller of claim 1, wherein the auxiliary information display area moves to a predetermined location regardless of a scrolling amount of the display image.

4. A display controller comprising:
   a display screen for presenting thereon a part of display information as a display image;
   an external input device for receiving and outputting a scroll instruction signal, which is externally supplied to scroll the display image;
   information storage for storing thereon auxiliary information to be presented on the display screen and information about a location at which auxiliary information is to be displayed; and
   means for deciding if the auxiliary information display area on the display screen is to be updated or not, based on the scroll instruction signal supplied from the external input device and the present display location information, and if the display location information is to be updated, updating the display location information such that the location of the auxiliary information displayed moves on the display screen in a direction in which the display image moves,
   wherein the display screen presents the auxiliary information as part of the display image based on the updated display location information.

5. The display controller of claim 4,
   wherein the display information is map information, and
   wherein the external input device is a key input device, a navigation controller or a GPS receiver.

6. A display controlling method comprising the steps of:
   a) presenting a part of display information as a display image on a display screen;
   b) defining an auxiliary information display area on part of the display screen;
   c) scrolling the display image in response to a scroll instruction signal externally supplied; and
   d) deciding if the auxiliary information display area on the display screen is to be moved or not, based on a present location of the auxiliary information display area and a scrolling direction, and if the auxiliary information display area is to be moved, moving the auxiliary information display area on the display screen in a direction in which the display image is scrolled.

7. The display controlling method of claim 6, wherein the display information is map information, and
   wherein the scroll instruction signal is generated using a key input device, a navigation controller or a GPS receiver.

8. A computer-readable storage medium having stored thereon a display control program for presenting a part of display information on a display screen, the display control program being executable in a computer for performing the steps of:
   a) presenting a part of the display information as a display image on the display screen;
   b) defining an auxiliary information display area on part of the display screen;
   c) scrolling the display image in response to a scroll instruction signal externally supplied; and
   d) deciding if the auxiliary information display area on the display screen is to be moved or not, based on a present location of the auxiliary information display area and a scrolling direction, and if the auxiliary information display area is to be moved, moving the auxiliary information display area on the display screen in a direction in which the display image is scrolled.

* * * * *